UNITED STATES PATENT OFFICE.

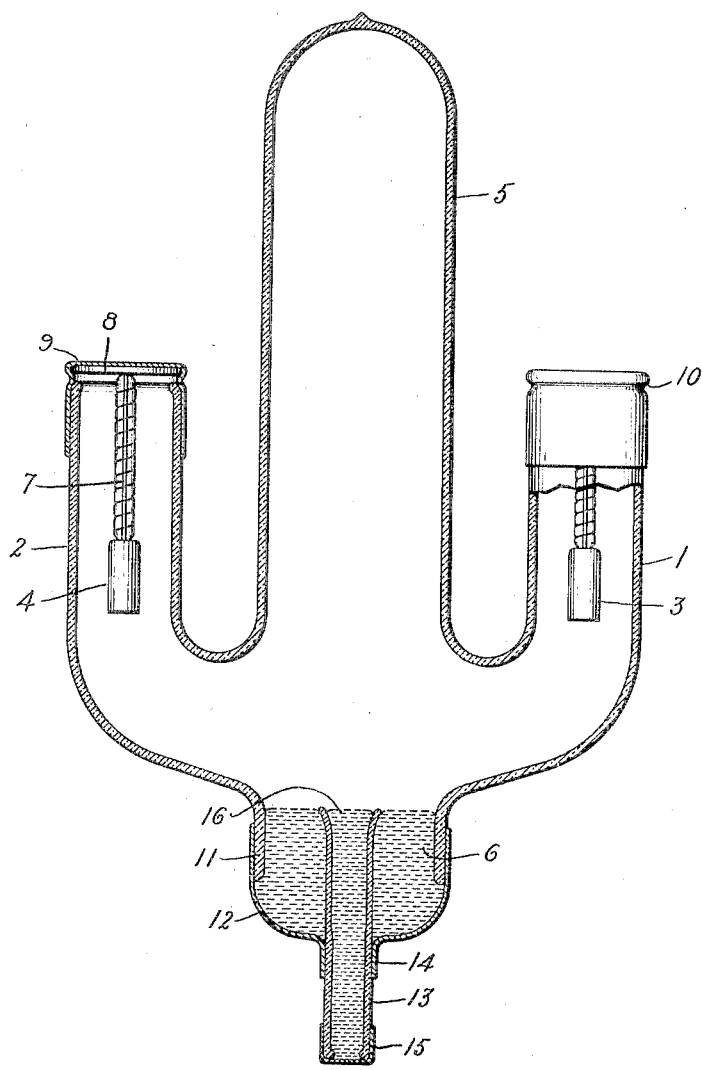

ALEXANDER M. JACKSON, OF SCHENECTADY, NEW YORK, ASSIGNOR TO GENERAL ELECTRIC COMPANY, A CORPORATION OF NEW YORK.

VAPOR ELECTRIC APPARATUS.

1,081,309.   Specification of Letters Patent.   Patented Dec. 16, 1913.

Application filed October 31, 1904.   Serial No. 230,719.

*To all whom it may concern:*

Be it known that I, ALEXANDER M. JACKSON, a subject of the King of Great Britain, residing at Schenectady, in the county of Schenectady, State of New York, have invented certain new and useful Improvements in Vapor Electric Apparatus, of which the following is a specification.

My present invention relates to improvements in connection with vapor electric devices, and to details in the construction thereof useful not only in vapor electric apparatus but in other relations as well.

The features of novelty characteristic of my invention I have pointed out with particularity in the appended claims. The invention itself however will be better understood by reference to the following description taken in connection with the accompanying drawings which represent a mercury vapor rectifier embodying my invention.

The rectifier which I have illustrated, as is usual in apparatus of this character, is provided with a cathode and a plurality of anodes, one of which anodes serves as a starting electrode. The rectifier envelop containing these electrodes consists of a glass receptacle exhausted as usual and having two laterally arranged vertical tubular chambers or arc tubes 1 and 2 serving each to contain or inclose one of the main positive electrodes or anodes 3 and 4. Between the chambers 1 and 2 is situated a portion of the receptacle 5 much larger than the chambers before mentioned and constituting a condensing chamber. The lower portion of the rectifier is fashioned so as to form a pocket containing a main body of mercury 6 constituting the cathode or negative electrode.

Referring again to the anodes 3 and 4, it will be noticed that they are not carried in the usual manner by leading-in conductors passing through the walls of the glass envelop. Thus for example the supporting wire or rod 7 for the anode 4 is provided at its upper end with a metal disk 8 riveted or otherwise secured thereto and held in place in the sheet-metal cap 9. This metal cap is spun, stamped or otherwise compressed about the disk 8 thereby forming a bead 10 shown perhaps best in the case of the electrode 3 at 10. The disk is thus solidly held in good electrical connection with the metal cap. The metal cap in turn closely and tightly encircles the open upper end of the walls of the chamber 1 and forms a vacuum tight seal. The joint made between the two is formed by first placing the cap over the end of the tubular chamber 2, which it loosely fits, and then, after heating the parts carefully in the usual glass-blower's gas jets to a temperature sufficient to soften the glass, an air pressure is applied so as to force the softened glass into intimate contact with the metal. Upon cooling, the metal shrinks tightly about the glass and forms a perfect hermetic joint with the same. The metal chosen should preferably be one having a higher coefficient of expansion than glass, such for example as copper, iron, suitable alloys, or the like, and sufficiently thin so that in contracting, or in tending to contract about the glass, it will give or stretch so as not to exert a crushing pressure upon the glass. A thickness of about one one-hundredth of an inch gives good results. A cap supports the electrode 3 in the same way that the electrode 4 is supported, but, unlike the support for electrode 4, the external appearance only of the construction is indicated in the drawing.

The bottom portion of the glass envelop of the rectifier is formed into a tubular mouth 11. A metal cap 12 is sealed about this tubular mouth in the same manner as the cap seals are applied to the tubular portions 1 and 2 of the rectifier envelop, and like the latter may be formed of a similar metal which, in the present instance, because of the presence of the mercury 6, is preferably iron with which the mercury will not amalgamate. The metal cap 12 may be imperforate and serve merely as a closure and current-conveying means. I find it convenient however to arrange the starting electrode, usually adjacent to the cathode 6, in a central position with respect to the cathode. This I do in the present case by means of a tube 13 of glass, fused quartz, or the like, which I cause to be sealed into a flanged opening 14 in the shell or cap 12 and to extend upward so as to be practically or nearly on a level with the surface of the mercury 6. This tube is sealed into the flanged portion 14 of the cap 12 in a manner already described. The lower end of the tube is closed by a metal cap 15 preferably of iron, sealed about the lower end of the tube. Mercury 16 fills this central tube 13 and constitutes a starting electrode which is connected to the circuit in a manner well known in the art.

In starting up the apparatus the receptacle is shaken so as to cause mercury to flow over the top of the tube 13 and make a temporary electrical bridge over the same, which as it breaks gives rise to a starting arc which puts the apparatus into operation. External electrical connection with the usual alternating potential source is, as will be evident, made with the electrodes through connection with the metal caps with which each is connected.

It will be noted that the tubular chambers or arc tubes 1 and 2 have bent portions or bends and inclose the anodes 3 and 4, located beyond the bends. The bends in the arc tubes lead to apertures opening into the main chamber or body 5 of the envelop in opposite directions. The outer portions of the arc tubes are arranged in a vertical position. Similar lateral extensions of the main rectifier envelop have been used before, but in these instances the extensions were inclined. I find it advantageous to have the extensions in a vertical position, since in this position no mercury, due to condensation, even though the amount of condensation is very small with the small size of chamber used, will be apt to drop or fall upon the electrode surface. This obviates the danger of arcing or flashing over between the anodes 1 and 2 which may take place whenever mercury is suddenly volatilized by contact with a hot anode. The presence of the bends in the arc tubes is also of assistance in preventing arcing.

The apparatus which I have shown in the drawings is intended merely as illustrative of my invention and, as will be evident to one skilled in the art, may be modified in a variety of ways. I therefore do not wish to be limited to the exact details shown and described.

What I claim as new and desire to secure by Letters Patent of the United States is,

1. A vessel a part at least of which is formed of vitreous material, a seal therefor consisting of a cap of metal tightly inclosing a portion of the vessel, and a conductor having an electrically conductive disk held in contact with the cap.

2. A vessel formed in part at least of vitreous material, a seal therefor consisting of a cap of metal tightly inclosing a portion of the vessel, a conductor having an electrically conductive disk held in contact with the cap, and an electrode connected to said conductor.

3. In a vapor electric apparatus, the combination of a vitreous envelop, a metal cap forming a tight joint with a portion of the envelop, a tube of vitreous material forming a tight joint with an opening in said cap and projecting into the envelop and electrode material in the tube and also surrounding the tube.

4. In a vapor electric apparatus, the combination of a vitreous envelop, a metal cap forming a tight joint with a portion of the envelop, a tube of vitreous material forming a tight joint with an opening in said cap and projecting into the envelop, and a metal cap closing the outer end of said tube.

5. The combination of a tubular vitreous member, a thin metal cap forming a tight joint therewith, and a conducting disk or plate inside said cap and in fixed relation to said cap.

6. The combination with a vapor electric apparatus, an exhausted envelop, provided with a negative electrode and a main chamber therefor, positive electrodes and separate chambers therefor, the chambers surrounding the positive electrodes being tubular and being provided with at least one bend leading to apertures opening into the main chamber in opposite directions.

7. A vapor rectifier comprising an exhausted envelop, provided with a negative electrode and a main chamber therefor, positive electrodes for connection to a source of alternating current, and separate tubular chambers surrounding the positive electrodes and provided with at least one bend leading to apertures opening into the main chamber in opposite directions.

8. A vapor rectifier comprising an exhausted envelop, provided with a negative electrode and a main chamber therefor, positive electrodes for connection to a source of alternating current, and separate tubular chambers surrounding the positive electrodes and provided with at least one bend leading to apertures opening in different directions into the main chamber.

9. A vapor rectifier having a vaporizable cathode, a cathode chamber surrounding the same, a plurality of arc tubes opening into said chamber and extending outward thereform, bends in said arc tubes, and solid anodes located beyond said bends and alternating in potential.

In witness whereof I have hereunto set my hand this 29th day of October, 1904.

ALEXANDER M. JACKSON.

Witnesses:
BENJAMIN B. HULL,
HELEN ORFORD.